United States Patent [19]
Kattas

[11] Patent Number: 5,381,988
[45] Date of Patent: Jan. 17, 1995

[54] TETHERED MODEL GYROGLIDER

[76] Inventor: Alex P. Kattas, 1845 Larpenteur Ave., #12, St. Paul, Minn. 55113

[21] Appl. No.: 161,923

[22] Filed: Dec. 3, 1993

[51] Int. Cl.⁶ ............................................. B64C 31/06
[52] U.S. Cl. ................... 244/153 A; 446/36; 416/148
[58] Field of Search ............. 244/17.11, 153 A, 154, 244/8; 416/148, 140; 446/36, 68

[56] References Cited

U.S. PATENT DOCUMENTS

| | | | |
|---|---|---|---|
| 2,035,629 | 3/1936 | Wing | 446/36 |
| 2,168,653 | 8/1939 | Meagher, Jr. | 446/68 |
| 2,429,502 | 10/1947 | Young | 244/154 |
| 3,194,521 | 7/1965 | Rider et al. | 244/154 |
| 3,233,679 | 2/1966 | Strydom | 416/148 |
| 3,669,564 | 6/1972 | Garfinkle | 416/148 |
| 4,092,084 | 5/1978 | Barltrop | 416/148 |
| 4,131,391 | 12/1978 | Robinson | 416/140 |
| 5,149,020 | 9/1992 | Rundle et al. | 244/153 A |

FOREIGN PATENT DOCUMENTS 698126 1/1931 France .................................. 244/8

OTHER PUBLICATIONS

Popular Mechanics, Nov. 1988 pp. 72-76 (especially Figure top of p. 73).

*Primary Examiner*—Galen L. Barefoot
*Attorney, Agent, or Firm*—Merchant, Gould, Smith, Edell, Welter & Schmidt

[57] ABSTRACT

A tethered model gyroglider having a fuselage, a rotor support extending upwardly from the fuselage, and a unitary two-bladed rotor rotatably mounted onto the rotor support. A teetering mechanism permits the rotor to pivot about an axis proximate the center of the rotor. When the gyroglider is subjected to a relative wind generally from a forward direction, the forward moving blade of the rotor is raised and the rearward moving blade is lowered. This equalizes the aerodynamic forces about the longitudinal axis of the fuselage, thereby eliminating the tendency of the gyroglider to roll in the direction of the rearward moving blade.

18 Claims, 3 Drawing Sheets

TETHERED MODEL GYROGLIDER

FIELD OF THE INVENTION

This invention relates generally to kites with a rotating surface, and more particularly to an unpowered, tethered model gyroplane.

BACKGROUND OF THE INVENTION

Kites of various shapes, sizes and configurations are well-known in the art. The vast majority of kite designs achieve lift through one or more stationary planar surfaces pulled by a string at a positive angle of attack relative to the wind.

Some of the kites found in the prior art include rotating surfaces. Rotating surfaces are typically incorporated primarily either for novel and amusement reasons or as a means for generating lift. U.S. Pat. Nos. 2,074,327 and 3,514,059 are examples of the former category, employing very large planar surfaces which rotate primarily for amusement purposes.

In the latter category, a rotor or propeller is typically employed as the rotating surface. In rotorcraft there exists a substantial lateral or roll stability problem due to asymmetric lift of the blades of the rotor. When subjected to a relative wind from a forward direction, a forward-moving blade experiences an increase in the speed of air flowing across its surface equal to the relative wind. Conversely, a rearward-moving blade experiences a decrease in the speed of air flowing across its surface equal to the relative wind. The result is that the forward-moving blade generates more lift than the rearward-moving blade, causing a tendency to roll in the direction of the rearward-moving blade.

Various approaches have been attempted to control this lateral stability problem. For example, some prior art designs have employed a pair of oppositely arranged propellers or rotors to effectively cancel out the tendency towards rolling (see U.S. Pat. Nos. 2,472,290 and 2,987,280). Other approaches which have been attempted include employing a large horizontal stabilizer to counter the rolling tendency or a yoke with a tether attached at opposite lateral ends (see U.S. Pat. No. 3,727,864).

Yet another approach is illustrated by U.S. Pat. No. 3,194,521. In this design, the blades of the rotor are independently hinged about a hub, thereby allowing a forward-moving blade to rotate upwardly in response to a forward relative wind. However, this approach is relatively complicated and expensive to manufacture, requiring numerous parts and a complex resilient section on the inner portion of each blade in order to achieve aerodynamic roll stability.

What has been needed is a simple, low cost, easy to manufacture, tethered model gyroplane which overcomes the aerodynamic lateral stability problems associated with rotorcraft.

SUMMARY OF THE INVENTION

According to the present invention, an unpowered, tethered model gyroplane is provided. The gyroplane of the present invention is referred to as a "gyroglider" because the rotor of the gyroplane is unpowered.

In one aspect of the invention, the gyroglider comprises a fuselage with a longitudinal axis and a rotor support extending upwardly from the fuselage. Mounted onto the rotor support is a two-bladed rotor rotating in a mean plane about a rotor axis. The two-bladed rotor is unitary, meaning that it moves as a single unit, although it may comprise one or several parts. A teeter mechanism permits the rotor to pivot about a teeter axis. The teeter axis is generally parallel to the mean plane and perpendicular to the rotor and is positioned proximate a center of the rotor.

In another aspect of the invention, the gyroglider comprises a fuselage with a rotor support connected thereto. A two-bladed rotor is rotatably connected to the rotor support, and a teeter mechanism permits the rotor to pivot about a teeter axis proximate the center of the rotor.

The teetering mechanism of the present invention provides a simple and effective way to achieve aerodynamic stability about the longitudinal axis of the fuselage. As illustrated in FIGS. 5 and 6, the problem of asymmetric lift caused by a forward relative wind is overcome by permitting the rotor to pivot about an axis proximate its center. As a forward-moving blade of the rotor experiences a relative wind from a forward direction, the increased flow of air across the forward-moving blade relative to the rearward-moving blade causes the forward-moving blade to be raised and the rearward-moving blade to be lowered. Thus, the increased lift of the forward-moving blade relative to the rearward-moving blade causes the rotor to "teeter" or "rock," rather than causing the gyroglider to roll in the direction of the rearward-moving blade. As a result, the aerodynamic forces about the longitudinal axis of the fuselage are equalized.

These and other advantages and features of novelty which characterize the invention are pointed out with particularity in the claims annexed hereto. However, for a better understanding of the invention and its advantages, reference should be made to the drawings which form a further part hereof, and to the accompanying descriptive matter in which there is illustrated and described a preferred embodiment of the invention.

DETAILED DESCRIPTION OF THE PREFERRED EMBODIMENT

Figure 1:
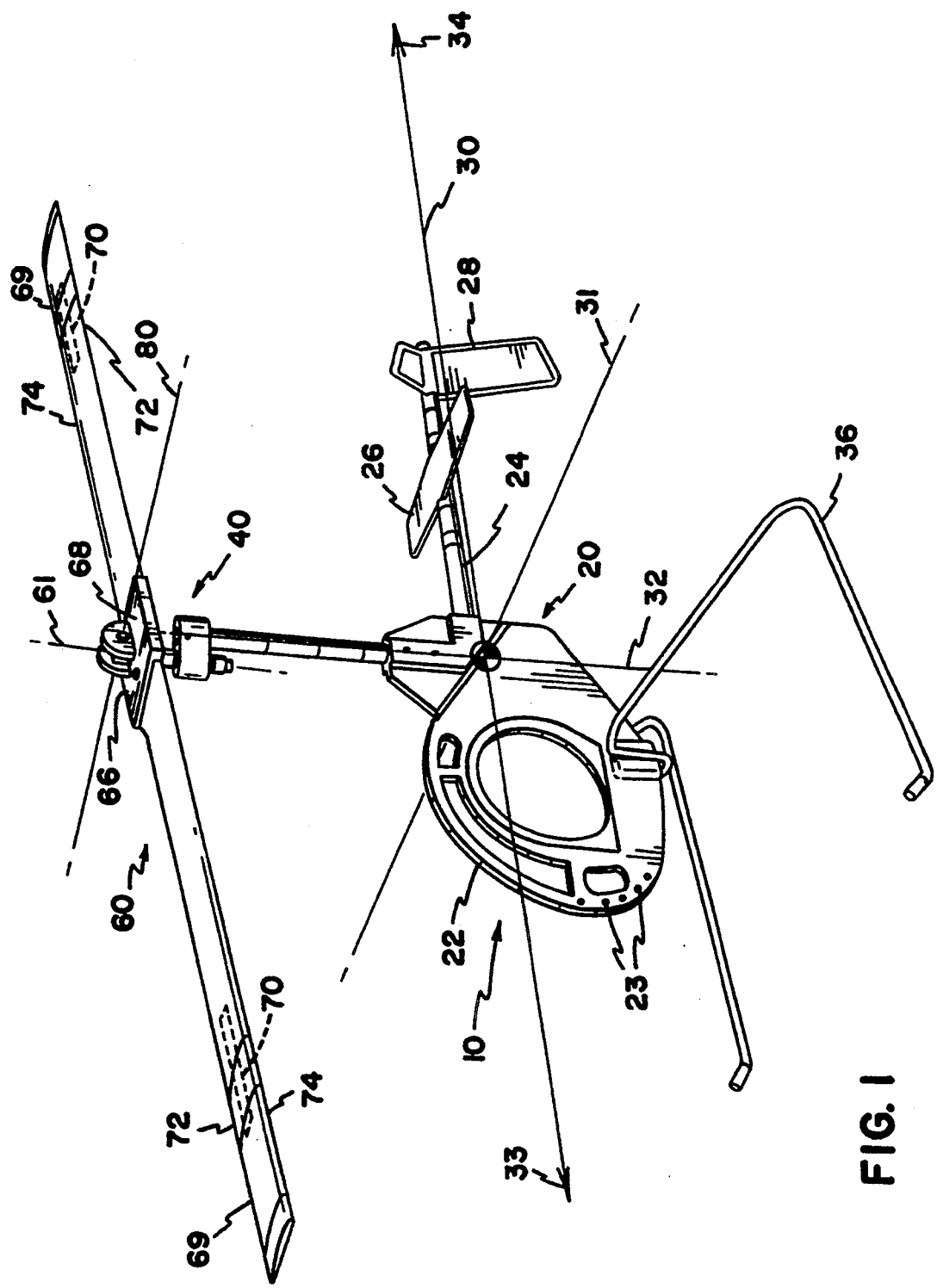
FIG. 1 is a perspective view of a tethered model gyroglider according to the present invention.

Referring now to the drawings, and particularly to FIG. 1, there is illustrated a tethered model gyroglider 10. Gyroglider 10 includes fuselage 20, rotor support 40 extending upwardly from fuselage 20, and rotor 60 rotatably mounted onto rotor support 40.

Fuselage 20 includes longitudinal axis 30 with forward 33 and rearward 34 vectors. Rotor 60 is two-bladed and is unitary, meaning that it moves as a single unit. Rotor 60 is permitted to pivot about teeter axis 80 proximate center 66 of rotor 60. Teeter axis 80 is preferably above rotor 60, but could be below or even with rotor 60.

Figure 5:
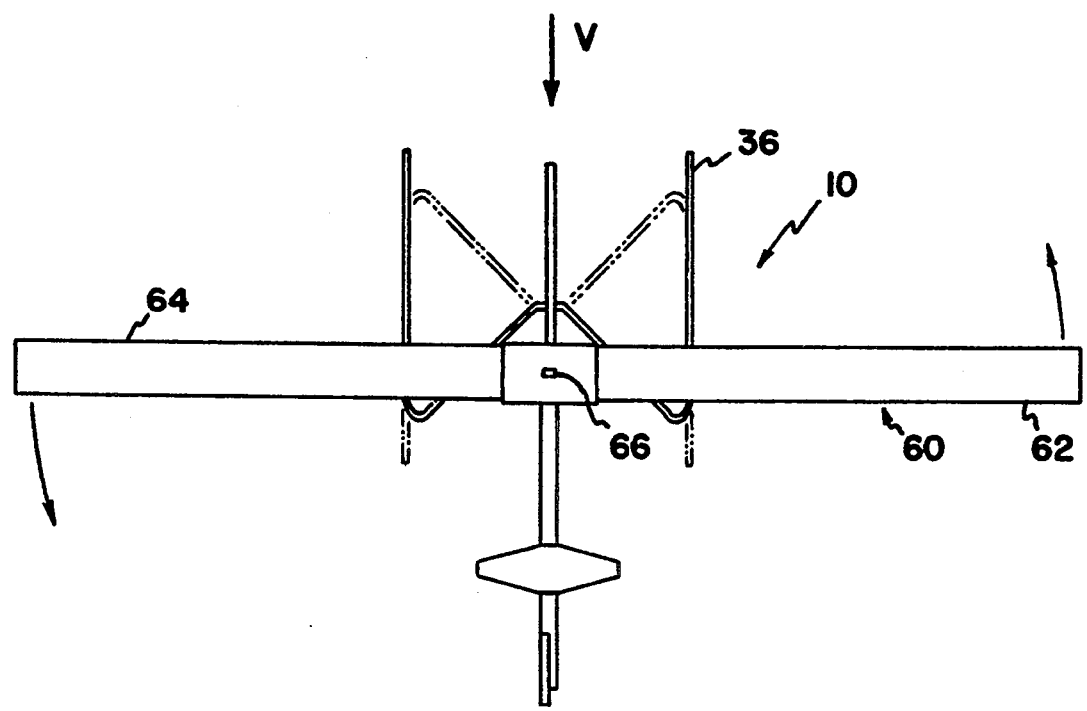
FIG. 5 is a schematic top view of a tethered model gyroglider according to the present invention, to illustrate the aerodynamic stability principles involved.
Figure 6:
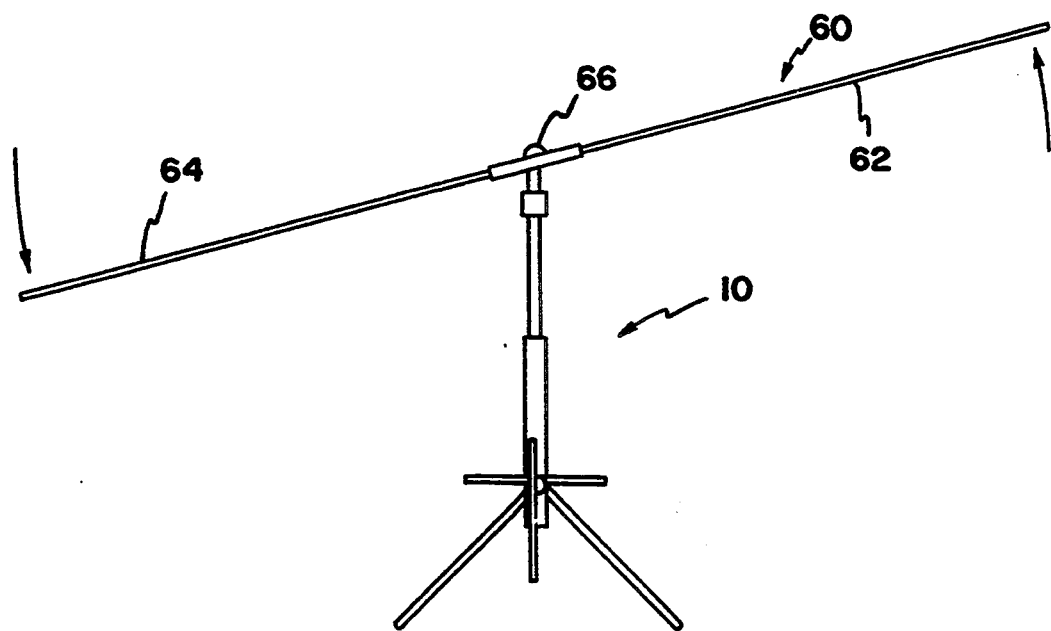
FIG. 6 is a schematic rear view of a tethered model gyroglider according to the present invention, to illustrate the aerodynamic stability principles involved.

As illustrated in FIGS. 5 and 6, when rotating rotor 60 is subjected to a relative wind V along rearward vector 34, air flow across forward moving blade 62 is increased and air flow across rearward moving blade 64 is decreased by an amount equal to V. The resulting increased lift of the forward moving blade 62 relative to the rearward moving blade 64 causes rotor 60 to tilt in the direction of the rearward moving blade 64. Thus, rather than the rolling tendency of rotor 60 causing gyroglider 10 to roll in the direction of rearward moving blade 64, the asymmetric lift between forward 62 and rearward 64 moving blades instead results in rotor 60 "teetering." This teetering motion effectively equalizes the aerodynamic forces about longitudinal axis 30 of fuselage 20. As a result, gyroglider 10 is aerodynamically stabilized.

In the preferred embodiment, the procession of the rotor blades is as follows. A blade is at its lowest point when pointed in a rearward direction 34. As the blade rotates in a forward direction, the blade is progressively raised, reaching its highest point when pointed in a forward direction 33. As the blade continues rearward, the blade progresses downward, again reaching its lowest point when pointed in a rearward direction 34. Rotor 60, therefore, does not rotate in a constant plane, but can De described as rotating in a "mean" or average plane parallel to teeter axis 80.

Figure 2:
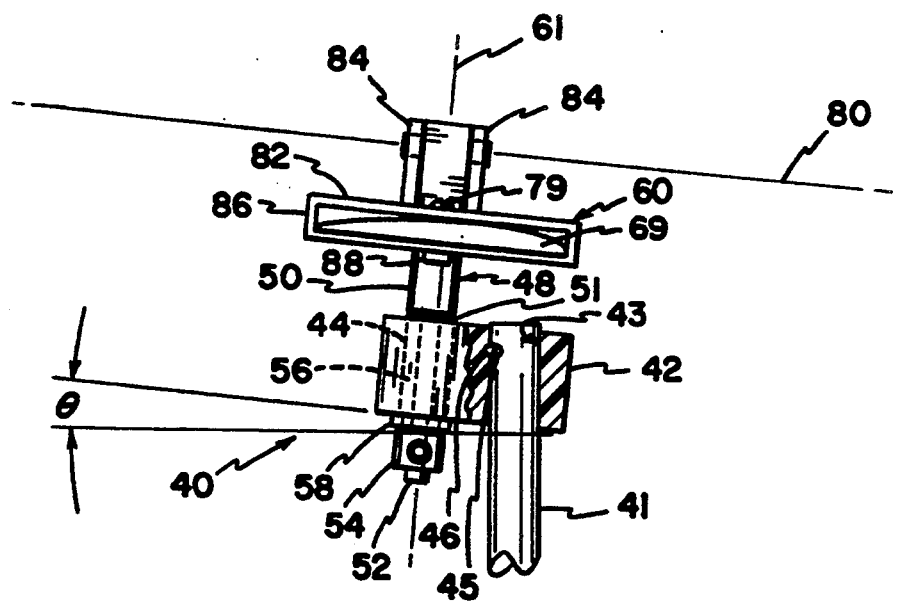
FIG. 2 is an enlarged side view of a rotor, hub, shaft, bushing, and mast assembly, according to the present invention.

Referring to FIG. 2, rotor support 40 includes mast 41 extending vertically from fuselage 20 and inserted into first aperture 43 of bushing 42, and a rotatable shaft 48 inserted into a second aperture 44 of bushing 42. It will be recognized by those skilled in the art that rotor support 40 could have various other configurations which could pivotally support rotor 60. For example, a pivotally attached rotatable shaft could be inserted into a bearing in a vertical mast or directly into the fuselage, or shaft 48 could be behind instead of in front of mast 41, or mast 41 and bushing 42 could be of one-piece construction.

In the preferred embodiment, mast 41 is attached to bushing 42 at an angle Θ. Θ is about between 2-8 degrees and is preferably 5 degrees, tilting the mean plane of rotation of rotor 60 to an incrementally higher angle of attack relative to longitudinal axis 30. It will be understood that this same result could be accomplished in various other ways, such as angling mast 41 relative to fuselage 20, or putting a bend in mast 41 equal to Θ.

Figure 3:
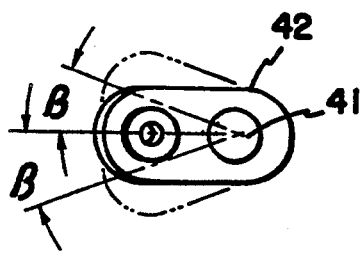
FIG. 3 is an enlarged top view of a pivotable bushing according to the present invention.

In the preferred embodiment, mast 41 is frictionally held within aperture 43 of bushing 42. As shown in FIG. 3, bushing 42 is pivotable about mast 41, permitting lateral movement of rotor axis 61. This allows gyroglider 10 to be trimmed if it is unbalanced, which would cause it to turn either to the left or right. For example, if gyroglider 10 has a tendency to roll to the left, bushing 42 can be turned to the left, thus trimming gyroglider 10 so that it flies level. Pin 46 extends through bushing 42 and slot 45 in mast 41, thereby limiting the extent to which bushing 42 can be rotated to a predetermined number of degrees B. In the preferred embodiment, B is approximately 20 degrees.

Shaft 48 includes nylon clevis sleeve 50 molded over a solid metal inner core 52. Shaft 48 is inserted into bearing 56, which is pressed into second aperture 44 of bushing 42. Flange 58 prevents bearing 56 from slipping upward through bushing 42. In the preferred embodiment, an OILITE bearing is used.

Shaft 48 is retained by collar 54, which includes a hex nut secured to inner core 52 thus preventing shaft 48 from rising upwardly. Bearing 56 extends above bushing 42 and provides a shaft supporting surface on which bottom 51 of sleeve 50 rides. Similarly, flange 58 provides a surface on which collar 54 rides. This extension of bearing 56 above and below bushing 42 minimizes friction and eliminates the need for washers.

Shaft 48 extends through aperture or slot 90 (best shown in FIG. 4) in hub portion 68 of rotor 60 and is pivotally attached above rotor 60. It will be understood that shaft 48 could also be pivotally attached below or even with rotor 60. Clevis sleeve 50 of shaft 48 includes nipples which are inserted into holes in vertical flanges 84 of hub 82, providing the pivot point for rotor 60. It will be understood by those skilled in the art that a variety of other configurations could be employed to achieve this pivoting action, such as inserting a bolt through flanges 84 and through a hole in shaft 48.

In order to prevent rotor 60 from pivoting too far downward and hitting bushing 42 or fuselage 20, the extent of the downward rotation of rotor 60 is limited. In the preferred embodiment, an apertured slot 90 in hub portion 68 of rotor is employed to achieve this end. Opposite ends 92 of slot 90 function as a "stop" preventing rotor 60 from pivoting further. In the preferred embodiment, when rotor 60 pivots, one of opposite ends 92 impinges upon shaft 48 below rotor 60, preventing further rotation. It will be understood that this could also be accomplished by one of opposite ends 92 impinging upon shaft 48 above rotor 60 or both above and below. Also, a variety of other configurations could be employed to function as a stop.

Figure 4:
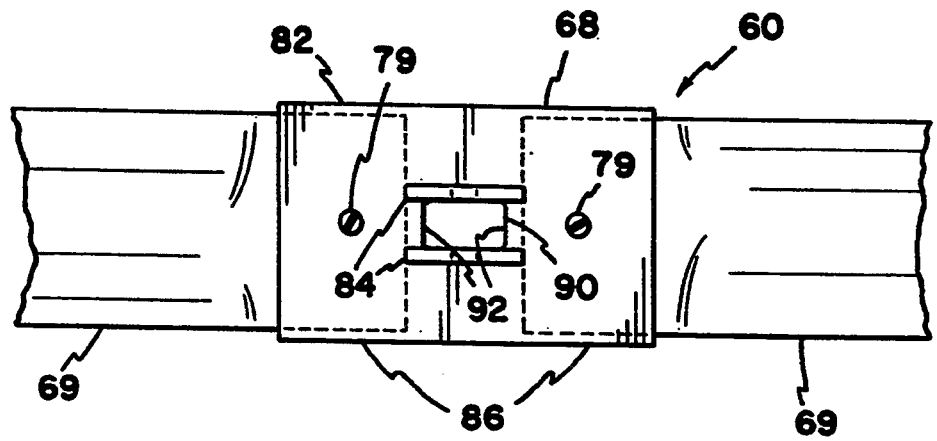
FIG. 4 is an enlarged top view of a center portion of a rotor, including two blades attached to a hub, according to the present invention.

While rotor 60 could be of one-piece construction, in the preferred embodiment rotor 60 comprises two balsa wood blades 69 inserted into pockets 86 of nylon hub 82, as shown in FIGS. 4 and 2. Blades 69 are preferably coated, with for example epoxy, for hardness. Nylon hub 82 includes vertical flanges 84. Blades 69 are held within hub 82 by screws 79, which extend through blades 69 and into screw bosses 88, best shown in FIG. 2. It may be preferable to have screws 79 inserted from below hub 82, with bosses 88 being above hub 82, to reduce the possibility of screws 79 or bosses 88 from interfering with bushing 42 during rotation of rotor 60. Also, nylon hub 82 can have cut-outs extending therethrough to reduce weight and manufacturing costs.

As best shown in FIGS. 1 and 2, the cross section of blades 69 is a flat-bottomed constant-section air foil. Blades 69 have no dihedral, pitch, wash-in or wash-out. This configuration has been chosen so that rotor 60 achieves lift through true "auto-rotation." The concept of auto-rotation is exhibited by the seed of the maple tree falling to the ground in autumn. By contrast to a helicopter, in which pitched blades generate lift by moving a column of air in a downward direction, auto-rotation is achieved by a flow of air through the rotor in an upward direction. The lifting force in auto-rotation is achieved by the airfoil of the blade truly "flying" in a column of air rising upwardly when the blades are at a positive angle of attack.

A problem encountered with auto-gyros is the tendency to over speed or under speed, particularly in response to wind gusts. In the preferred embodiment, this problem is overcome by weights 70 in outer portion 72 of rotor 60 at approximately the quarter chord point measured from leading edge 74 of rotor 60, as shown in FIG. 1. Weights 70 help to store added energy and angular momentum in rotor 60, thus stabilizing the rotational speed of rotor 60.

Fuselage 20 includes body section 22 and tail boom 24 extending rearwardly. Tether attachment holes 23 are provided in the forward end of fuselage 20. The various holes 20 can be used depending on the strength of the wind in which gyroglider 10 is flown. In lower winds, the lower holes are used because a higher angle of attack is required to achieve lift, and in higher winds the higher holes are used to reduce the angle of attack of rotor 60 relative to the wind. Although gyroglider 10 can be flown without vertical 28 or horizontal 26 stabilizers, they are included in the preferred embodiment to provide added stability about yaw 32 and pitch 31 axis respectively.

Vertical stabilizer 28 serves a second function in that it is used to limit the extent of the "nose-up" rotation of gyroglider 10 when it is on the ground. This allows the user to perform "touch-and-go's." The user can allow gyroglider 10 to land and pull on the tether so that gyroglider rotates onto vertical stabilizer 28, thereby placing the mean plane of rotation of rotor 60 at an angle of attack appropriate for permitting gyroglider 10 to take off again. In the preferred embodiment, this angle is approximately 30 degrees.

Landing gear 36 are made of resilient metal and biasingly engage body section 22 of fuselage 20. Landing gear 36 are detachable, and as shown in FIG. 5 landing gear 36 can be reattached in a reverse orientation. This permits changing the center of gravity of gyroglider 10, thereby changing the longitudinal stability characteristics of gyroglider 10. In the preferred embodiment, reversing the landing gear 36 moves the center of gravity forward.

It should be understood that the present invention is not limited to the preferred embodiment discussed above, which is illustrative only. By way of example, the present invention is not limited to a gyroglider with a single rotor. For instance, teetering rotors can be arranged in a tandem or a side-by-side configuration and still achieve aerodynamic stability about the longitudinal axis of the fuselage. Also, the rotor support need not necessarily extend vertically from fuselage, but can extend at an angle or possibly off to the side, and the rotor support could be of various configurations capable of pivotally supporting a rotor. Further changes may be made in detail, especially in matters of shape, size, arrangement of parts, and material of components within the principles of the invention, to the full extend indicated by the broad general meanings of the terms in which the appended claims are expressed.

What is claimed is:

1. A tethered model gyroglider comprising:
   (a) a fuselage having a longitudinal axis with forward and rearward vectors;
   (b) rotor support means for supporting a rotor for rotation in a mean plane above said fuselage, said rotor support means extending upwardly from said fuselage;
   (c) a unitary two-bladed rotor rotatably mounted onto said rotor support means, said rotor rotating in said mean plane about a rotor axis;
   (d) teeter means for permitting said rotor to pivot about a teeter axis generally parallel to said mean plane and generally perpendicular to said rotor proximate a center of said rotor such that, when the gyroglider is subjected to a relative wind generally along said rearward vector, a forward-moving blade of said rotor is raised and a rearward-moving blade of said rotor is lowered, thereby equalizing the aerodynamic forces about said longitudinal axis; and
   (e) roll trim means for changing a lateral position of said rotor axis relative to said longitudinal axis of said fuselage, comprising:
      (i) a bushing having first and second apertures said second aperture defining a bearing;
      (ii) a mast extending upwardly from said fuselage and inserted into said first aperture; and
      (iii) a rotatable shaft for supporting said rotor inserted into said bearing of said second aperture;
      (iv) said bushing being pivotable about said mast to permit changing said lateral position of said rotor axis to trim the gyroglider about said longitudinal axis.

2. A tethered model gyroglider according to claim 1, wherein said teeter means comprise said rotatable shaft pivotally connected to a hub portion of said rotor for pivotal movement about said teeter axis.

3. A tethered model gyroglider according to claim 2, further comprising teeter limiting means for limiting the extent of the downward rotation of the rearward-moving blade and the upward rotation of the forward-moving blade to a predetermined number of degrees.

4. A tethered model gyroglider according to claim 3, wherein said teeter limiting means include a stop.

5. A tethered model gyroglider according to claim 4, wherein said stop comprises an aperture through the center of said rotor having opposite ends, wherein the extent of the downward rotation of the rearward-moving blade and the upward rotation of the forward-moving blade is limited by at least one of said opposite ends of said aperture impinging upon said shaft.

6. A tethered model gyroglider according to claim 5, wherein said rotor comprises at least one blade member and a hub member, said hub member including said aperture, said shaft extending through said aperture and being pivotally connected to said hub member above said rotor.

7. A tethered model gyroglider according to claim 1, wherein the pivotal position of said bushing is held in place by a friction fit between said mast and an inner wall of said first aperture of said bushing.

8. A tethered model gyroglider according to claim 7, wherein the extent of the pivotal rotation of said bushing about said mast is limited by a slot in a side of said mast and a pin extending through said bushing and said slot wherein, as said bushing is rotated in either direction, said pin impinges upon said mast, thereby limiting the extent of the rotation of said bushing to a predetermined number of degrees.

9. A tethered model gyroglider according to claim 1, wherein said second aperture of said bushing is defined by a bearing member fixedly held within said bushing, said rotatable shaft having an inner core member held at least partially within an outer sleeve member, with a bottom surface of said outer sleeve member being supported by a shaft supporting surface, and further including shaft retaining means for preventing said shaft from rising upwardly.

10. A tethered model gyroglider according to claim 9, wherein said bearing extends sufficiently above and below said bushing to prevent said bottom surface of said sleeve member from rubbing against an upper surface of said bushing and said shaft retaining means from rubbing against a lower surface of said bushing, respectively, thereby reducing the friction generated when said shaft is rotated.

11. A tethered model gyroglider according to claim 1, wherein said bushing is connected to said mast at a slight angle, such that said mean plane of rotation of said rotor is about between two to eight degrees upward relative to said forward vector of said fuselage.

12. A tethered model gyroglider according to claim 1, wherein each of the blades of said rotor includes at least one weight in an outer portion of said blades proximate a leading edge of said blades, thereby preventing said rotor from speeding up or slowing down excessively.

13. A tethered model gyroglider according to claim 1, the fuselage having a horizontal pitch axis perpendicular to said longitudinal axis, the gyroglider further including a horizontal stabilizer attached to said fuselage for providing stability about said pitch axis.

14. A tethered model gyroglider according to claim 1, the fuselage having a vertical yaw axis perpendicular to said longitudinal axis, the gyroglider further including a vertical stabilizer attached to said fuselage for providing stability about said yaw axis.

15. A tethered model gyroglider according to claim 2, wherein said rotor comprises at least one blade member and a hub member, said hub member being detachably connected to said rotatable shaft, thereby permitting replacement of said rotor.

16. A tethered model gyroglider according to claim 1, further comprising landing gear detachably connected to said fuselage, said landing gear being attachable to said fuselage in a first and a second orientation, wherein changing from said first to said second orientation varies the center of gravity of said gyroglider along said longitudinal axis, thereby affecting the longitudinal aerodynamic stability characteristics of said gyroglider.

17. A tethered model gyroglider according to claim 1, further comprising pitch limiting means for limiting the extent of the pitch rotation of the gyroglider when it is on the ground such that, when the gyroglider lands the tether can be pulled to rotate the gyroglider onto said pitch limiting means, thereby placing said mean plane of rotation of said rotor at an angle of attack relative to said relative wind appropriate to cause said gyroglider to regain flight.

18. A tethered model gyroglider comprising:
(a) a fuselage having a longitudinal axis;
(b) rotor support means for supporting a rotor above said fuselage, said rotor support means extending upwardly from said fuselage;
(c) a rotor rotatably mounted onto said rotor support means, said rotor rotating about a rotor axis;
(d) roll trim means for changing a lateral position of said rotor axis relative to said longitudinal axis of said fuselage, comprising:
(i) a bushing having an aperture defining a bearing;
(ii) a mast extending upwardly from said fuselage and pivotally connected to said bushing; and
(iii) a rotatable shaft for supporting said rotor inserted into said aperture;
(iv) said bushing being pivotable about said mast to permit changing said lateral position of said rotor axis to trim the gyroglider about said longitudinal axis.

* * * * *